Patented Dec. 18, 1923.

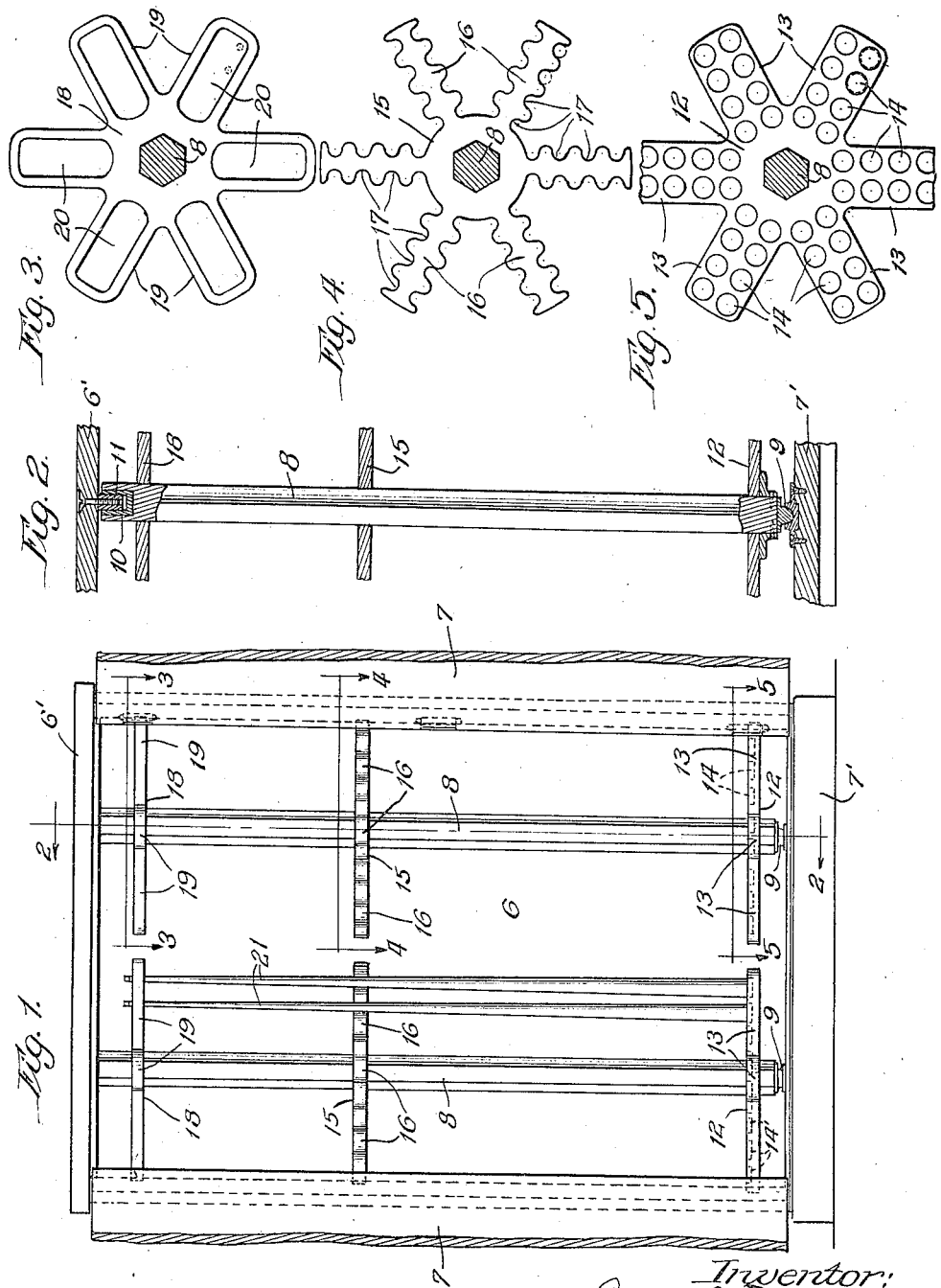

1,478,043

UNITED STATES PATENT OFFICE.

JESSE O. MATTESON, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

ROTARY CUE RACK.

Application filed July 5, 1921. Serial No. 482,391.

*To all whom it may concern:*

Be it known that I, JESSE O. MATTESON, a citizen of the United States, residing at Muskegon, in the county of Muskegon and State of Michigan, have invented certain new and useful Improvements in Rotary Cue Racks, of which the following is a specification.

This invention relates to racks for holding cues used in playing billiards and pocket billiards and its object is to provide a rotary rack of large capacity and simple construction which can be easily turned to permit the insertion of a cue in any vacant place or to permit the removal of any cue, and to enable such insertion and removal of cues to be effected without injury thereto.

Another object of the invention is to provide a cue rack of large capacity which occupies a comparatively small space and which can be rotatively mounted in a cabinet so that it may be readily turned to bring any vacant space or any cue in convenient position for the insertion or removal of a cue.

In the accompanying drawings I have illustrated a selected embodiment of the invention and referring thereto.

Fig. 1 is an elevation of a cabinet having two of my rotary racks mounted therein, the doors of the cabinet being thrown open and partly broken away.

Fig. 2 is a sectional view on the line 2—2 of Fig. 1.

Fig. 3 is a transverse sectional view on line 3—3 of Fig. 1.

Figs. 4 and 5 are views similar to Fig. 3 on the lines 4—4 and 5—5 respectively of Fig. 1.

Referring to the drawings 6 designates a cabinet of suitable size, shape and construction to hold one or more of the cue racks and preferably provided with one or more swinging doors 7. The cue rack comprises a standard or supporting shaft 8 mounted to rotate between the top 6' and the bottom 7' of the cabinet. The standard rotates in a suitable bearing 9 on the bottom of the cabinet and at its upper end it is provided with a socket 10 to receive a guide 11 secured to the top of the cabinet and operating to hold the standard in upright position at all times.

A base 12 is rigidly mounted on the standard 8 and it is provided with a plurality of arms 13 which project outwardly in the general form of a spider. The arms are provided at their sides and ends with sockets 14 to receive the butt ends of the cues and it will be noted by reference to Fig. 5 that in a comparatively small space a large number of cues may be stored.

A rack spider 15 is mounted on the standard between its ends and is provided with a plurality of outwardly projecting arms 16 having recesses 17 in their side edges corresponding and registering with the sockets 14 in the base.

A retaining spider 18 is mounted on the standard 8 near the top thereof and it is provided with a plurality of outwardly projecting arms 19 registering with the arms 13 and 16 of the base spider and the rack spider and provided with openings or slots 20 to receive the upper ends of the cues which are supported on the base spider and held upright in spaced relation by the rack spider.

My invention provides a cue rack of simple construction and large capacity which will occupy a small space compared with its capacity and which can be conveniently mounted and installed in a cabinet not only because of its size and capacity but also because it can be easily rotated to bring any vacant space or any cue into accessible position. It is apparent that the size of the spiders, the number of the arms thereon and the provision on each arm for the cues may be increased or diminished as desired. The arms of each spider are arranged in registration with the arms of the other spiders so that any cue inserted in a socket will register in upright position and enter a slot. The cue is supported on the base spider and the socket thereon prevents accidental displacement of the cue; the recess in the rack spider holds the cue upright in spaced relation to adjacent cues; and a slotted arm of the upper spider retains the cue in place in a socket of the lower spider and in a recess of the intermediate spider, and permits the insertion and removal of the cue without injury to the tip. The slot or opening in the arm of the upper spider may be of considerable width and thus allow considerable freedom in inserting and removing the cue. It will be noted in this connection that the butt end of the cue 21 rests in a socket in the lower spider; the cue rests between its ends in a socket of the intermediate spider and one side of the cue engages the base of the socket; and the opposite side of the cue adjacent the tip thereof will engage the adjacent side wall of the slot in the registering arm of the upper spider, so that the butt end of the cue being steadied in position by the socket the spider bar engages one side of the cue intermediate of its ends and the slotted bar engages the opposite side of the cue near its upper end, thereby holding the cue securely in upright position.

I am aware that changes in the form, size, construction and arrangement of parts of my invention may be made without departing from the spirit, or sacrificing any of the advantages thereof and I reserve the right to make all such changes as fairly fall within the spirit and scope of the following claims:

I claim:

1. A cue rack comprising a rotary standard and having a plurality of spiders spaced apart to rotate therewith and having outwardly projecting registering arms, the lower spider having sockets on the upper side of each arm adjacent the edges thereof, the intermediate spider having recesses in the side edges of each arm and the upper spider having slots in each arm.

2. A cue rack comprising a rotary standard, a plurality of spiders spaced apart on the standard to rotate therewith and having outwardly projecting arms, the lower spider having sockets to receive the butt ends of the cue, the intermediate spider having its arms provided with recesses in the side edges registering with said sockets to engage the cues on one side thereof, and the upper spider having its arms provided with slots and adapted to engage the cues on the opposite sides thereof.

3. A cue rack comprising a rotary standard and having a plurality of spiders spaced apart to rotate therewith, the lower spider having outwardly projecting arms having sockets on the upper side of each arm adjacent the edges thereof, the intermediate spider having means for receiving the cues, said means registering with the sockets in the lower spider, and the upper spider having outwardly projecting arms having a plurality of slots in each arm adjacent the edges thereof and registering with the sockets in the lower spider.

4. A cue rack comprising a rotary standard and having a plurality of spiders spaced apart to rotate therewith, the spiders having means for supporting a plurality of cues arranged in a plane substantially parallel to a radius of the rotary standard.

5. A cue rack comprising a rotary standard having a plurality of spiders spaced apart to rotate therewith and having outwardly projecting registering arms, the lower spider having sockets on the upper side of each arm adjacent the edges thereof, and the upper spider having slots in each arm.

JESSE O. MATTESON.